United States Patent

Bonvallat et al.

[11] Patent Number: 6,099,343
[45] Date of Patent: Aug. 8, 2000

[54] MODULE FOR INTERCONNECTING TWO MONOPAIR LINES

[75] Inventors: Pierre Bonvallat, Cluses; Xavier Fasce, Marigner, both of France

[73] Assignee: Pouyet, S.A., France

[21] Appl. No.: 09/174,824

[22] Filed: Oct. 19, 1998

[30] Foreign Application Priority Data

Oct. 21, 1997 [FR] France .................................. 97 13403

[51] Int. Cl.⁷ ....................................................... H01R 4/24
[52] U.S. Cl. .......................... 439/412; 439/395; 379/412
[58] Field of Search .................... 439/412, 409, 439/402, 535, 188, 509, 505, 395; 379/399, 412; 200/51.1; 174/51

[56] References Cited

U.S. PATENT DOCUMENTS

| | | | |
|---|---|---|---|
| 5,090,922 | 2/1992 | Rymer et al. ........................... | 439/676 |
| 5,515,436 | 5/1996 | Bonvallat ................................. | 379/412 |
| 5,575,679 | 11/1996 | Hammer et al. ........................ | 439/396 |
| 5,588,869 | 12/1996 | Jensen et al. ........................... | 439/417 |
| 5,600,716 | 2/1997 | Broome et al. ......................... | 379/399 |
| 5,857,870 | 1/1999 | Carter ..................................... | 439/402 |

Primary Examiner—Paula Bradley
Assistant Examiner—Alexander Gilman
Attorney, Agent, or Firm—Richard P. Gilly

[57] ABSTRACT

This invention relates to a module, made in one and the same piece, intended for interconnecting two monopair lines, typically two telephone or computer-related lines. It brings together in one module an alignment of three functional zones: a first functional zone of connection of the two "large wires" by I.D.C. and pusher with screw, a second functional zone comprising a test and possibly protection chamber closed by a cut-off lid, and a third functional zone comprising two I.D.C.'s for connection of the "small wires" and a connection pusher.

22 Claims, 6 Drawing Sheets

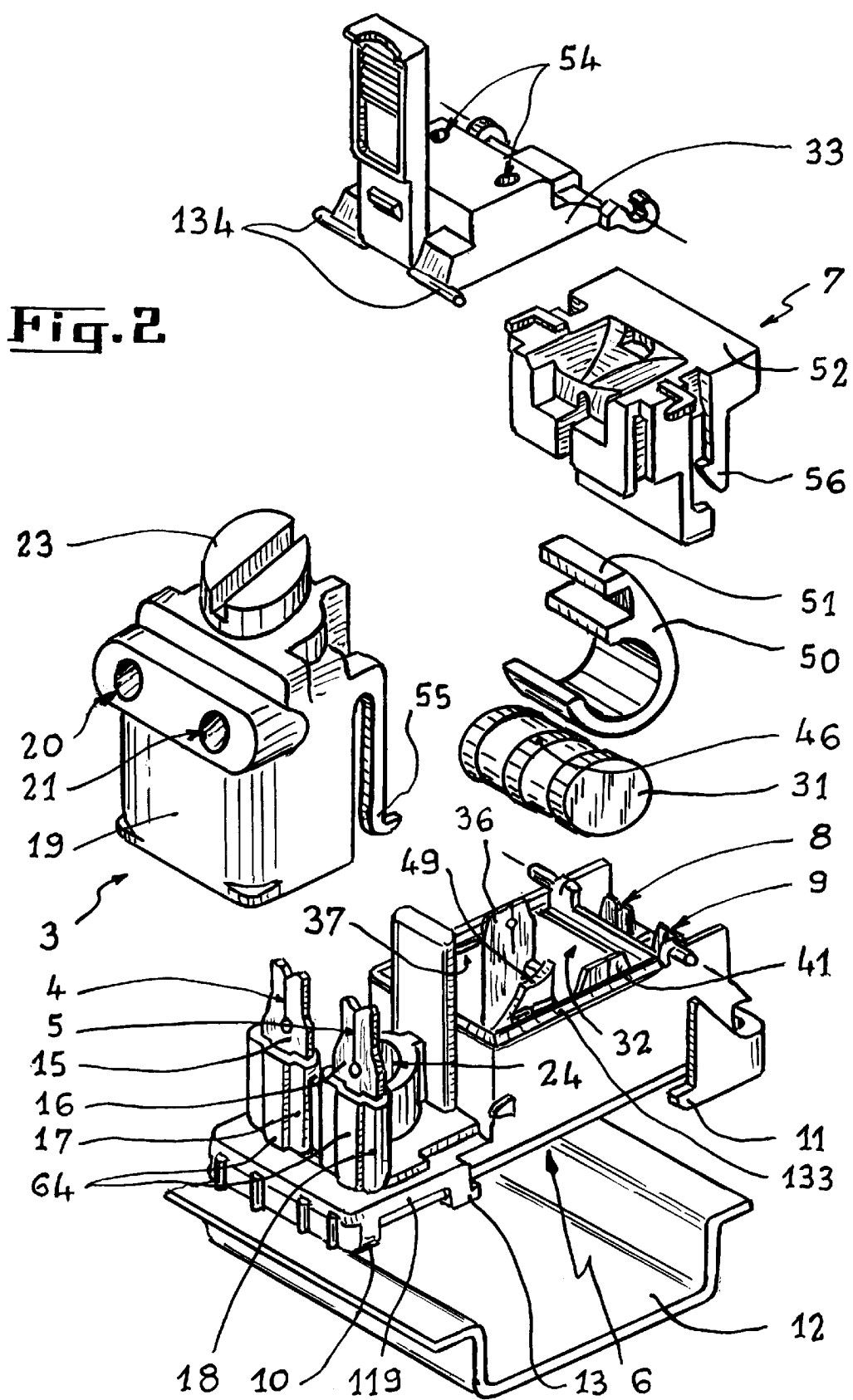

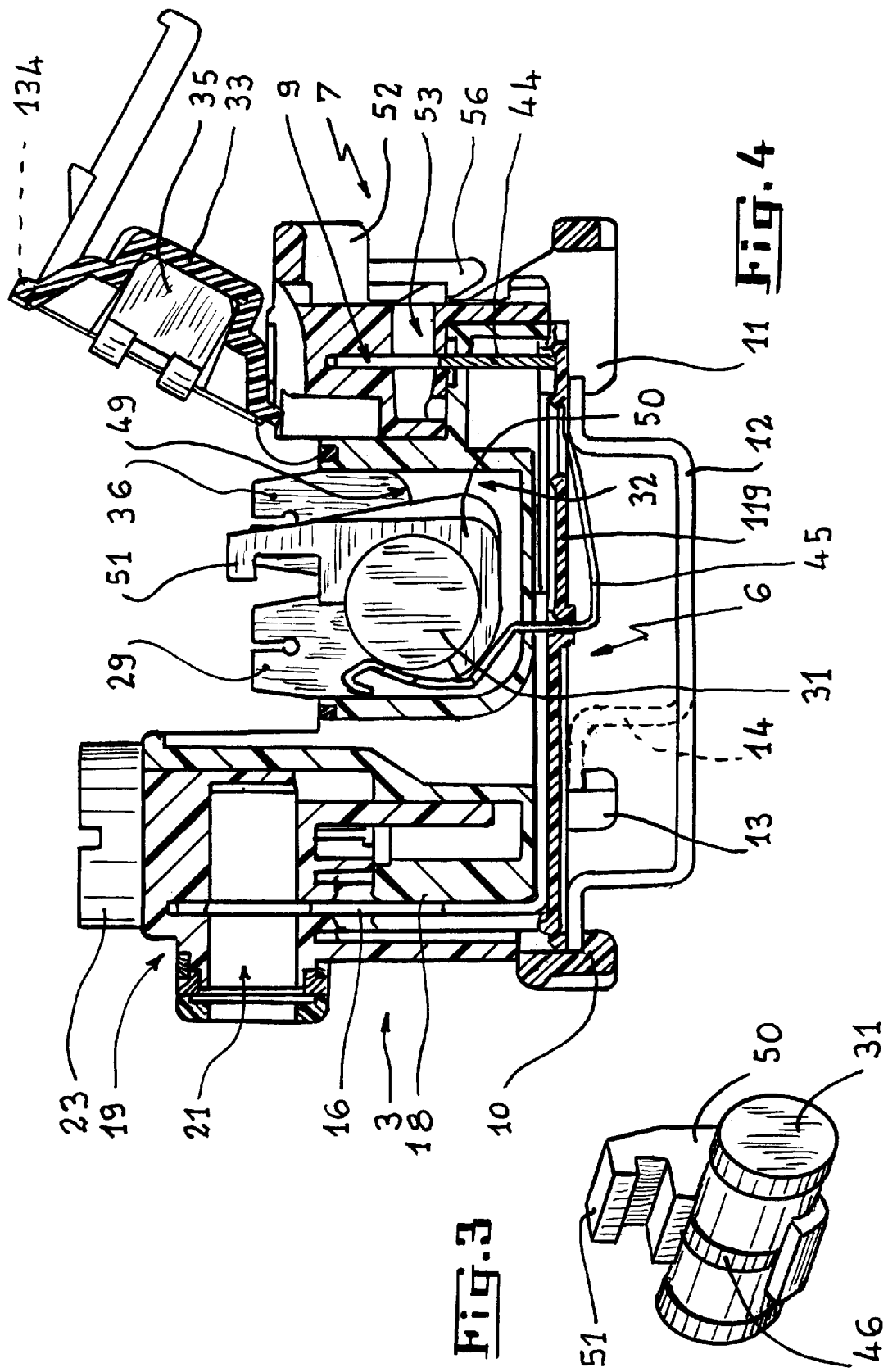

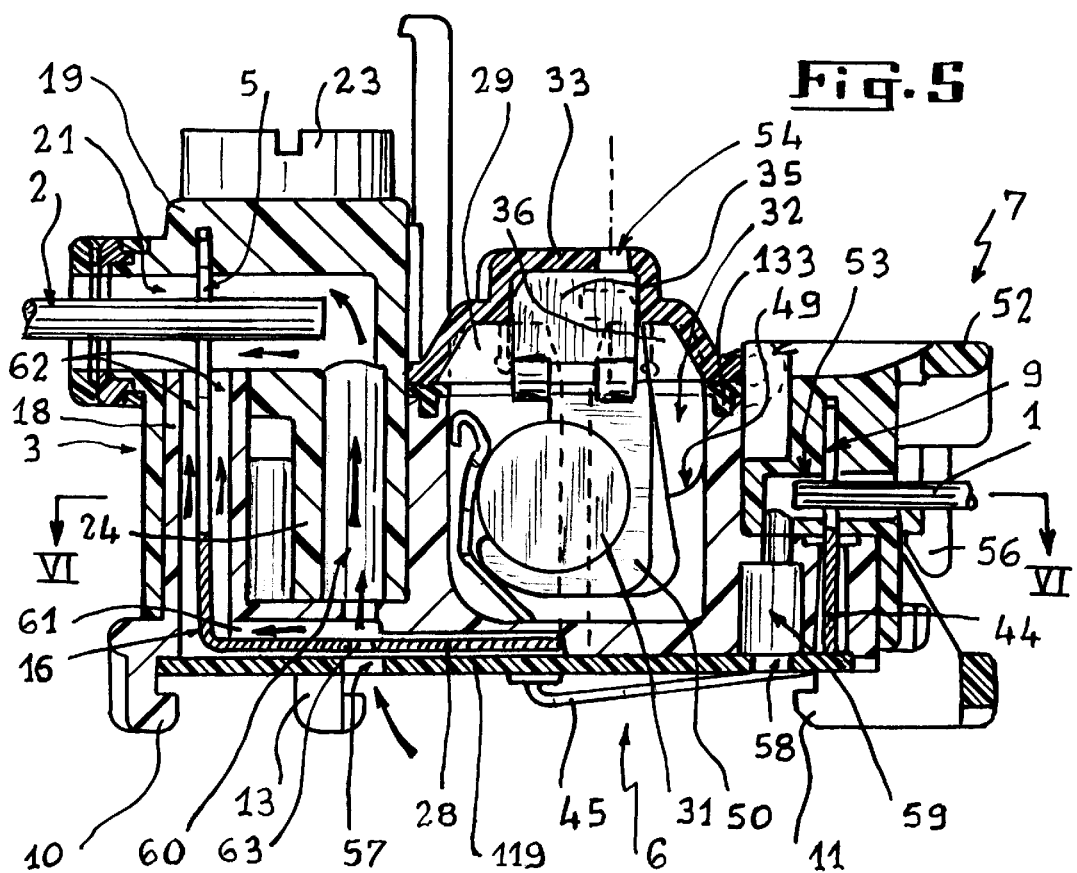
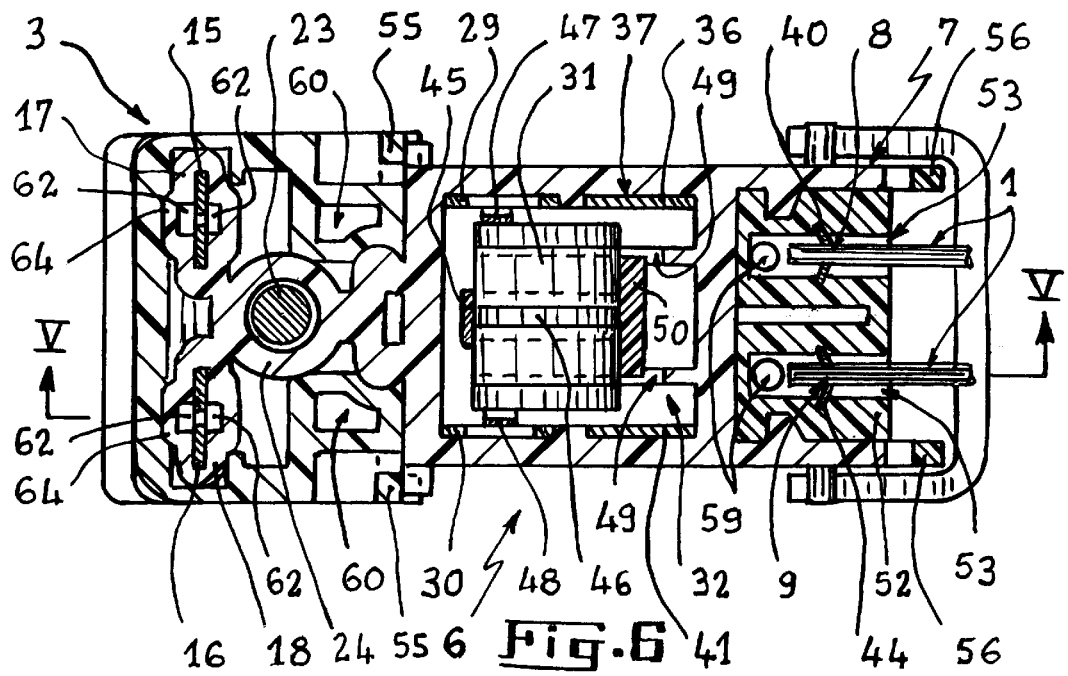

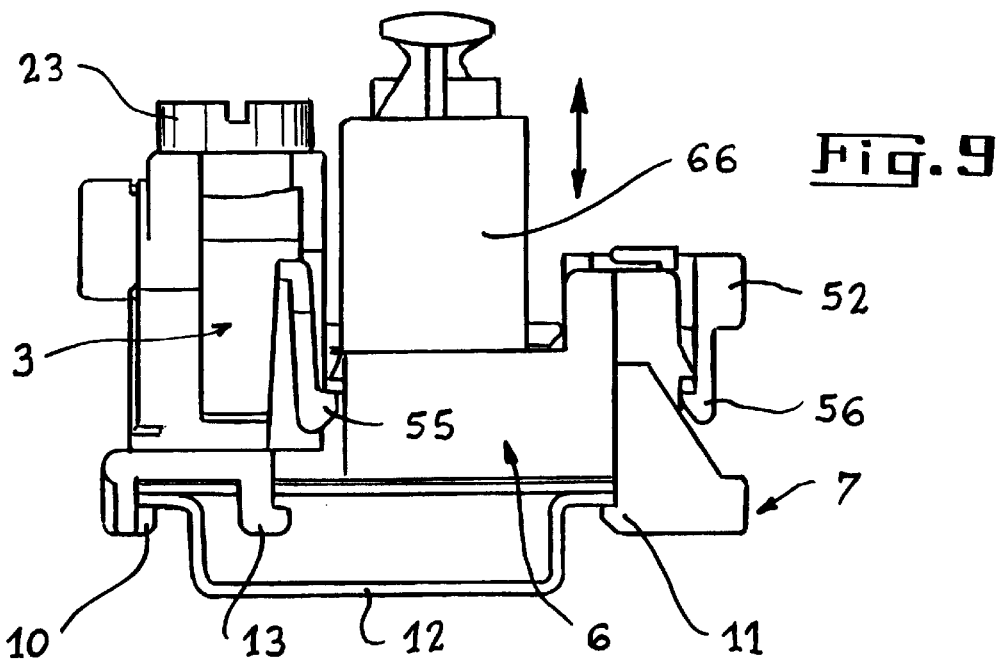
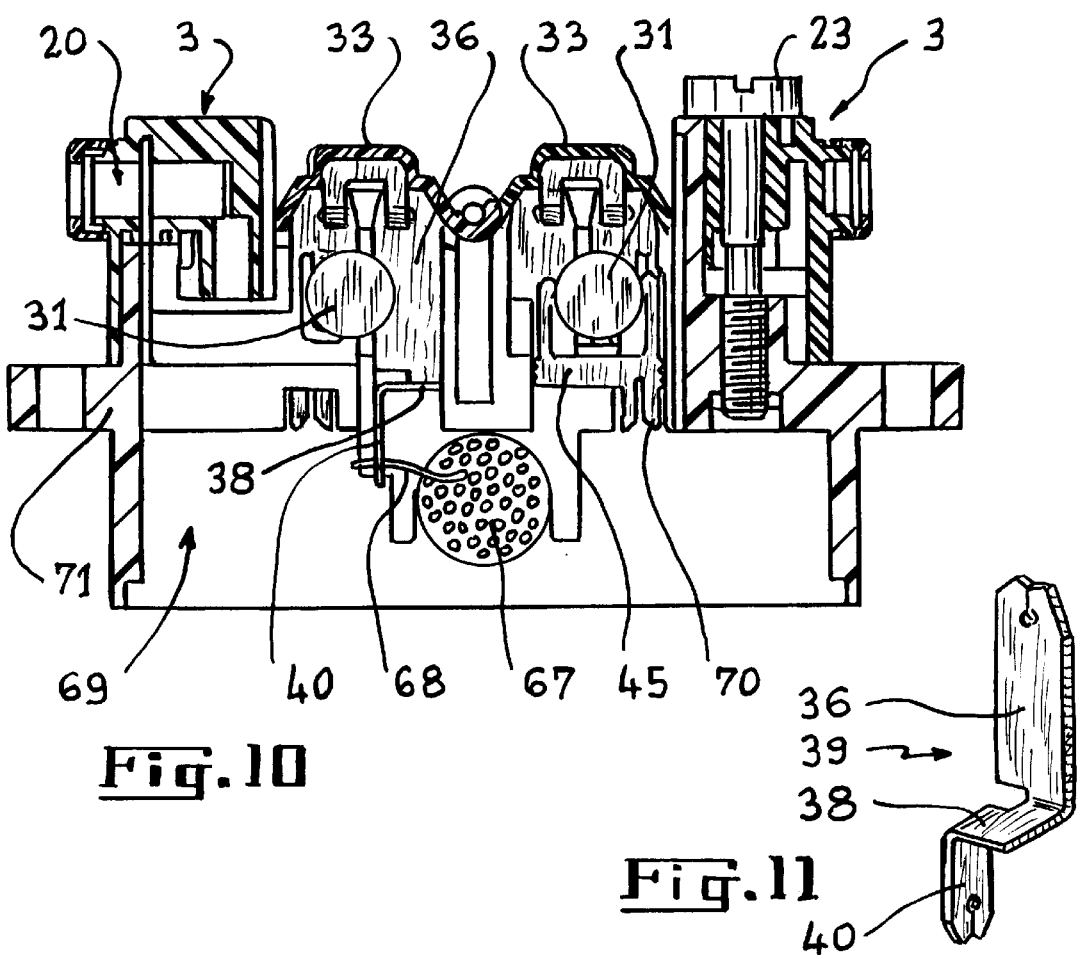

MODULE FOR INTERCONNECTING TWO MONOPAIR LINES

FIELD OF THE INVENTION

The present invention relates to a module for the interconnection of two monopair lines, viz. an incoming line and an outgoing line, typically two telephone or computer-related lines, this module being in one piece and employing so-called insulating-displacing contacts or I.D.C.'s.

BACKGROUND OF THE INVENTION

Modules of this type are modules for which the connection of the two lines is effected without a tool other than a simple screwdriver. They are for example described in U.S. Pat. No. 5,515,436 and are widely sold by Applicants.

Such modules are generally provided to connect a line comprising so-called "small wires", whose diameter is of the order of 0.4 mm to 0.8 mm, to a line comprising larger wires, whose diameter may generally vary between 0.5 and 1.1 mm.

Up to the present time, it was endeavoured to use only one and the same master screw for effecting the connection, on their respective I.D.C.'s, of both the incoming and the outgoing wires.

Consequently, the incoming wires, generally the "small wires" are firstly connected by a first descent of the screw, pushing their I.D.C.'s, and they cannot be withdrawn thereafter, as their I.D.C.'s can in that case no longer be returned to their starting position.

These modules, according to U.S. Pat. No. 5,515,436 for example, often comprise a line protection and cut-off device, incorporating a lightning arrester or excess voltage protector, this device being constituted by an assembly adapted to plug in on the interconnection module. However, the fact that it is question of a plug-in assembly penalizes the cost price of such an interconnection module.

Document U.S. Pat. No. 5,371,648 may be cited as state of the art, concerning an interconnection module in which may be plugged a module for protection without cut-off of line.

Document U.S. Pat. No. 4,763,354 may be cited as state of the art concerning an interconnection module incorporating a protection device without possibility of cut-off of line.

Document EP-A-0 710 040 may be cited as state of the art relative to an interconnection module incorporating a line cut-off and test device. According to this document, the line cut-off and test device is composed of a chamber which contains the free ends of four metal test blades and which is hermetically closed by a lid which ensures line continuity when it is closed and which, on the contrary, cuts the line when it is open.

Furthermore, at the present time, the particular requirements of the users must be satisfied as economically as possible, and these known modules are not easily modifiable by the constructor to enable such requirements to be satisfied at lower costs.

It is consequently an object of the invention to propose a module which not only makes it possible to disconnect and reconnect the two "small wires" as desired, but which may be adapted, at lower costs, to various particular uses or configurations which may be demanded by the users.

In addition, it is at present conventional to fill the orifices for introduction of the two pairs of wires with a sealing gel, before use. This is relatively difficult, as these are blind orifices and filling thereof by the sealing gel causes the detrimental existence of air bubbles in the bottom of these orifices. According to an advantageous aspect, the invention overcomes this drawback by forming the module so that such filling of the blind wire-introduction orifices, is effected via the bottom of these orifices and not via their opening, by means of special gel-injection channels which open out in the bottom of each of these orifices.

SUMMARY OF THE INVENTION

To that end, the invention relates to a module for interconnection of two monopair lines, viz. an incoming line and an outgoing line, this module being in one and the same piece and employing insulation-displacing contacts, or "I.D.C.'s" to produce the connection of the respective ends of the sheathed electric wires of each of the two pairs, the two sheathed electric wires, called "small wires" of one of the two lines having a conducting core which is of diameter smaller than that of the respective conducting core of each of the two sheathed electric wires, or "large wires" of the other line, this module further comprising a line cut-off device, characterized in that:

said line cut-off device is incorporated in the interconnection module in the form of a test chamber comprising the free ends of four test blades or strands of the four line terminals and which is hermetically closed by a lid for line continuity or cut-off by interconnection, or not, of these test blades, the pair of insulation-displacing contacts relative to the two "large wires" and the pair of insulation-displacing contacts relative to the two "small wires" are respectively positioned on either side of this chamber, the pair of insulation-displacing contacts relative to the two "large wires" is associated with a first insulating device for receiving these two wires and for forced introduction thereof in their respective insulating-displacing slots, this first device comprising, in manner known per se, a master actuation screw for pushing these two wires in these receiving slots, this insulating device for forced connection of the large wires being placed on the same side of the chamber as said pair of insulation-displacing contacts, and the other pair of insulation-displacing contacts relative to the two "small wires" is associated with a second insulating device for receiving and forced introduction of these small wires, which is placed on the same side of the chamber as this other pair.

This test chamber is preferably arranged to receive, in removable manner, a lightning arrester or "excess voltage protector".

The excess voltage protector may advantageously be retained in insulating nippers comprising a gripping member which is flush with or projects beyond the opening of the chamber when this excess voltage protector is positioned in the chamber with these nippers, and which then remain in this chamber with the excess voltage protector which they hold, with the result that this excess voltage protector can be easily extracted from this chamber with the aid of these nippers.

This module advantageously comprises one or more orifices for injection of a sealing gel, this or these orifices being connected in the body of the module, to one or more gel injection channels, which at least terminate in the bottom of the two blind orifices for introduction of the two "large wires" and in the bottom of the two blind orifices for introduction of the two "small wires", in order that these four blind orifices are filled with gel via the bottom of these blind orifices and not via their opening, which avoids the formation of air bubbles.

The insulating device for receiving and forced introduction of the small wires is advantageously a simple hand-actuated connection pusher.

BRIEF DESCRIPTION OF THE DRAWINGS

The invention will be more readily understood on reading the following description of a non-limiting example with reference to the accompanying drawings, in which:

FIG. 2 is a partially exploded perspective view thereof.

FIG. 3 is an enlarged detail showing the particular system of gripping and holding its excess voltage protector.

FIG. 4 is a first longitudinal and vertical section of this module, showing the latter with its cut-off flap open.

FIG. 5 is another longitudinal section thereof, along V—V of FIG. 6, flap closed, wires connected, and showing the circuit for injection and passage of the sealing gel.

FIG. 6 is a horizontal section along VI—VI of FIG. 5.

FIG. 9 shows how this module may be easily modified for a client wishing to use a plug-in module for cut-off, or cut-off and protection, according to document U.S. Pat. No. 5,515,436.

FIGS. 10 and 11 show how this module may be easily adapted by a multiple, so-called "block" assembly effected in the factory on a multi-line incoming cable.

DESCRIPTION OF PREFERRED EMBODIMENTS

Figure 1:
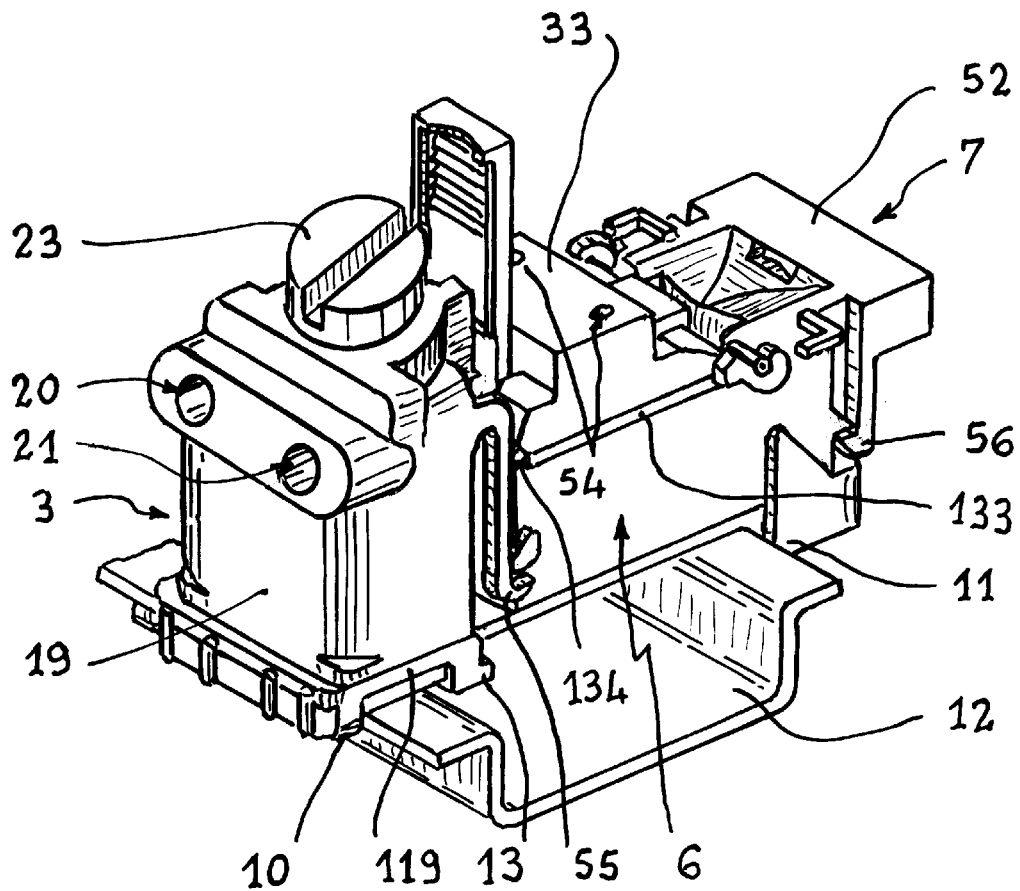
FIG. 1 is an overall perspective view of this module.

Referring now to the drawings, and firstly to FIGS. 1 to 8, it is question of a module for interconnection of two monopair telephone or computer-related lines, for example (FIG. 5):

a bifilar wire 1 comprising two sheathed electric wires, called "small wires", each having a conducting core with a diameter of from 0.4 mm to about 0.8 mm (for example here equal to 0.4 mm), and a bifilar line 2 comprising two sheathed electric wires, called "large wires", each having a conducting core included between 0.5 and 1.1 mm (for example here equal to 0.8 mm).

Being question for example of two telephone lines, bifilar line 1 comes from the multi-line incoming cable which forms part of the telephone network, while bifilar line 2 is the outgoing line towards the subscriber.

In another configuration, the "large wire" line 2 is composed of two aerial wires coming from the telephone network, while the "small wire" line 1 is the outgoing line towards the subscriber's interior installation. In such a case, the "large wire" line 2 is the incoming line, while the "small wire" line 1 is the outgoing line.

According to the invention, this module which, like the modules of the prior art mentioned hereinabove, is a module with so-called "no tool" connection (i.e. without a tool other than a simple screwdriver), is composed in fact, in one and the same block, of three aligned portions, electrically connected together, and having clearly distinct functionalities.

More precisely, these three aligned portions are as follows (from left to right in the accompanying Figures):

a first portion 3, forming a first end of the alignment, whose functionality is limited to the connection of the two large wires 2 by driving-in in two respective insulation-displacing slots 4, 5 (FIG. 2);

a second portion 6 which forms the middle of the alignment, and which constitutes the line cut-off and test zone as well as the "protection" zone receiving a lightning arrester or "excess voltage protector";

and a third portion 7, forming the other end of the alignment, whose functionality is limited to the connection of the two small wires 1 by driving-in in two respective insulation-displacing slots 8, 9 (FIG. 2).

It should therefore be noted that portions 3, 7 for connection of the wires are therefore located on either side of the central portion 6 for cut-off, test and protection.

Like all the modules of the prior art, this module is provided to be fixed (FIG. 4), by tabs 10, 11 forming slideway, on a standardized metal rail 12.

According to an interesting particularity of this module, it presents at least one additional tab 13, closer to tab 11 than tab 10, making it possible (FIG. 4) also to mount this module on a standardized rail 14, narrower than rail 12.

The portion 3 for connection of the two large wires 2 comprises two I.D.C.'s 15, 16 which are placed in holding receptacles 17, 18 orthogonally with respect to the base 119 of the module. The dimensions of these contacts are adapted for receiving the large wires 2, whose core may have a diameter of up to about 1.1 mm.

There is plugged onto the assembly 15 to 18 a now conventional insulating pusher-cover 19 for receiving and connecting the two large wires by passage thereof in the respective insulation-displacing slots 4, 5 of the two I.D.C.'s 15, 16.

To that end, the pusher-cover 19 comprises two blind orifices 20, 21 for receiving the two respective large wires 2, and it is equipped with a master screw which passes through a receiver chamber 24 which forms part of the base, screwing at the bottom of this chamber in a conventional metal nut (not shown) or directly in a tapping moulded in this base. By screwing this screw 23, the connecting cover 19 is descended, which drives the large wires 2, previously introduced in the blind orifices 20, 21, into the insulation-displacing slots 4, 5 of the two I.D.C.'s 15 and 16, which is conventional per se.

The two I.D.C.'s 15, 16 each form part of a respective complex contact 25, 26 (FIG. 8), made as a cut-out flat metal circuit, which electrically connects them, each via a longitudinal and longilinear branch 27, 28 respectively, to a test and reception contact 29, 30 of an excess voltage protector 31.

These two test contacts 29, 30 form part of the above-mentioned median portion 6 of the module.

This median portion 6 is constituted by a chamber 32 of rectangular section (FIG. 2) comprising an O-ring 133 and closed or not by a pivoting lid 33 which itself comprises, like the one described as a variant in document EP-A-0 710 040 mentioned above, two contacts 34, 35 (FIGS. 8, 4, 5) for line continuity.

When the lid 33 is closed, the contacts 34 and 35 electrically connect together:

contact 29 with a flat contact 36 which is applied, like this contact 29, against one of the two longitudinal inner surfaces 37 (FIG. 2) of the chamber 32 and which is connected, via a longitudinal connection branch 38 forming part of a complex contact 39, to a first I.D.C.

40 of the third portion 7, intended to receive one of the two small wires 1.

contact 30 with another flat contact 41, identical to contact 36 but applied on the opposite surface of the chamber, this contact 41 likewise forming part of a complex contact 42 which connects it, by a longitudinal branch 43, to the second I.D.C. 44 for receiving the second small wire 1, Furthermore, the chamber 32 includes an earth contact 45 (FIGS. 2, 4, 5, 8) which abuts, under the module, against the metal receiving rail 12 or 14 and which, in the chamber 32, is located halfway between the contacts 29 and 30 in order to be able to receive the median earth electrode 46 of the excess voltage protector 31 when it is in place between two advanced elastic portions 47, 48 of the respective contacts 29 and 30.

The chamber 32 presents, internally and in its middle, a suitable profile 49 for guiding the excess voltage protector 31 between its receiving contacts 47 and 48.

In addition, according to an interesting aspect, the excess voltage protector 31 is removably retained in insulating nippers 50 (FIGS. 2 and 3). These nippers 50 comprise a manual gripping member 51 which projects beyond the opening of the chamber 32 when the protector 31 is positioned in this chamber, with these nippers 50, which then remain in the chamber with the protector which they hold. The protector 31 can in that case easily be extracted from the chamber with the aid of its holding nippers 50. When the lid 33 is closed, the protuberant gripping portion 51 is then housed in the hollow of this lid.

The third portion 7 mentioned above comprises the two I.D.C.'s 40, 44 for insulation-displacing connection of the small wires 1 as well as an insulating connection pusher 52 which is plugged on these two I.D.C.'s 40, 44.

In manner known per se in the I.D.C. technique, the pusher 52 comprises two blind orifices 53 for respectively receiving each of the small wires 1.

Conventionally, the two small wires 1 are firstly introduced in these orifices 53, the pusher 52 being raised, then the pusher is pushed manually on the I.D.C.'s 40, 44, to make it descend therealong and thus drive the two small wires 1 in their respective insulation-displacing slots 8 and 9. The pusher 52 in that case remains in place and it is then possible to disconnect the wires 1 simply by lifting this pusher to disengage these wires from the insulation-displacing slots 8, 9, in the same way as the large wires 2 may be disconnected by unscrewing the screw 23 to lift the cover 19.

It should be noted that the lid 33 may be optionally pierced, as shown, with two orifices 54 filled with a grease or sealing gel via which a respective test plug may be passed, which is known per se in other devices.

It should also be noted that both the connection cover 19 and the connection pusher 52 each preferably present one or more end-of-stroke catches 55, 56 which not only ensure, by their end-of-stroke clipping, a solid positioning of the pusher, but, by the clacking sound made by such clipping, also inform the assembler that the insulation-displacing connection is positively effected.

Furthermore, as seen in FIG. 2, the pivoting lid 33 presents at least one lateral locking catch 134 (here a catch 134 on each side of the lid 33) which, when the connection cover 19 is lifted by the master screw 23 being unscrewed, renders this cover 19 captive as long as this lid is closed. If, however, for reasons of exploitation, the assembler nevertheless needs to extract this cover 19, it suffices to that end to open the pivoting lid 33, which disengages the catch 134 and then allows this extraction of the cover 19.

The chamber 32 is hermetically closed, as it is not suitable to fill it with a sealing gel if it is desired, as explained in document EP-A-0 710 040 mentioned above, to be able to effect renewable line tests with the aid of alligator clips which individually clip one or the other of the test contacts 29, 30, 36, 41.

On the other hand, the two blind orifices 20, 21 and the two blind orifices 53 must preferably be filled with a sealing gel or grease, and the four I.D.C.'s 15, 16, 40, 44 must preferably be coated with such a gel or grease.

According to an extremely interesting aspect of the present invention, this module comprises a special circuit for injection of the sealing gel or grease, through four (this number being given only by way of non-limiting example) small injection orifices provided in the base 19 of the module:

two injection orifices 57 at the front, for the sealing gel or grease which will fill, via the rear thereof, the two orifices 20, 21 for introduction of the large wires 2, and which will, in addition, coat the two I.D.C.'s 15 and 16, via a particular path, and two injection orifices 58 at the rear, for the sealing gel or grease which will fill, via the rear thereof, the two orifices 53 for introduction of the small wires 1, coating the two I.D.C.'s 40 and 44 by this operation, thanks to the existing clearances (not visible in the drawing).

Figure 7:
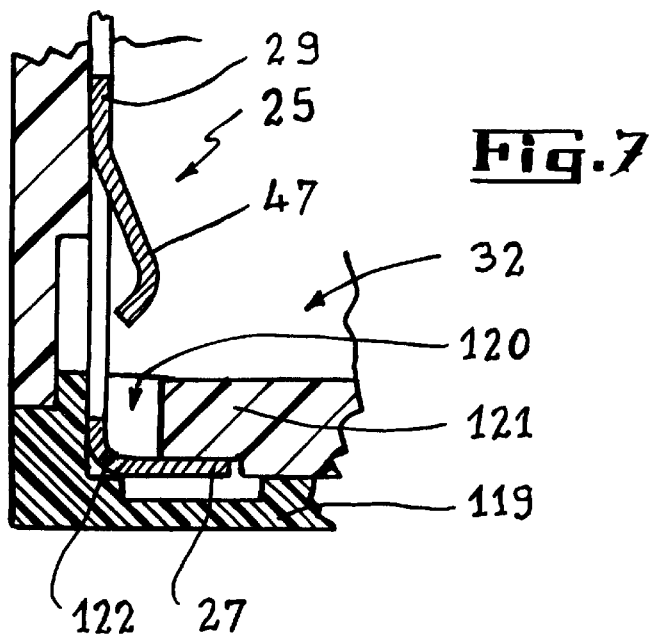
FIG. 7 is a partial transverse section made at the level of a contact for receiving the excess voltage protector.
Figure 8:
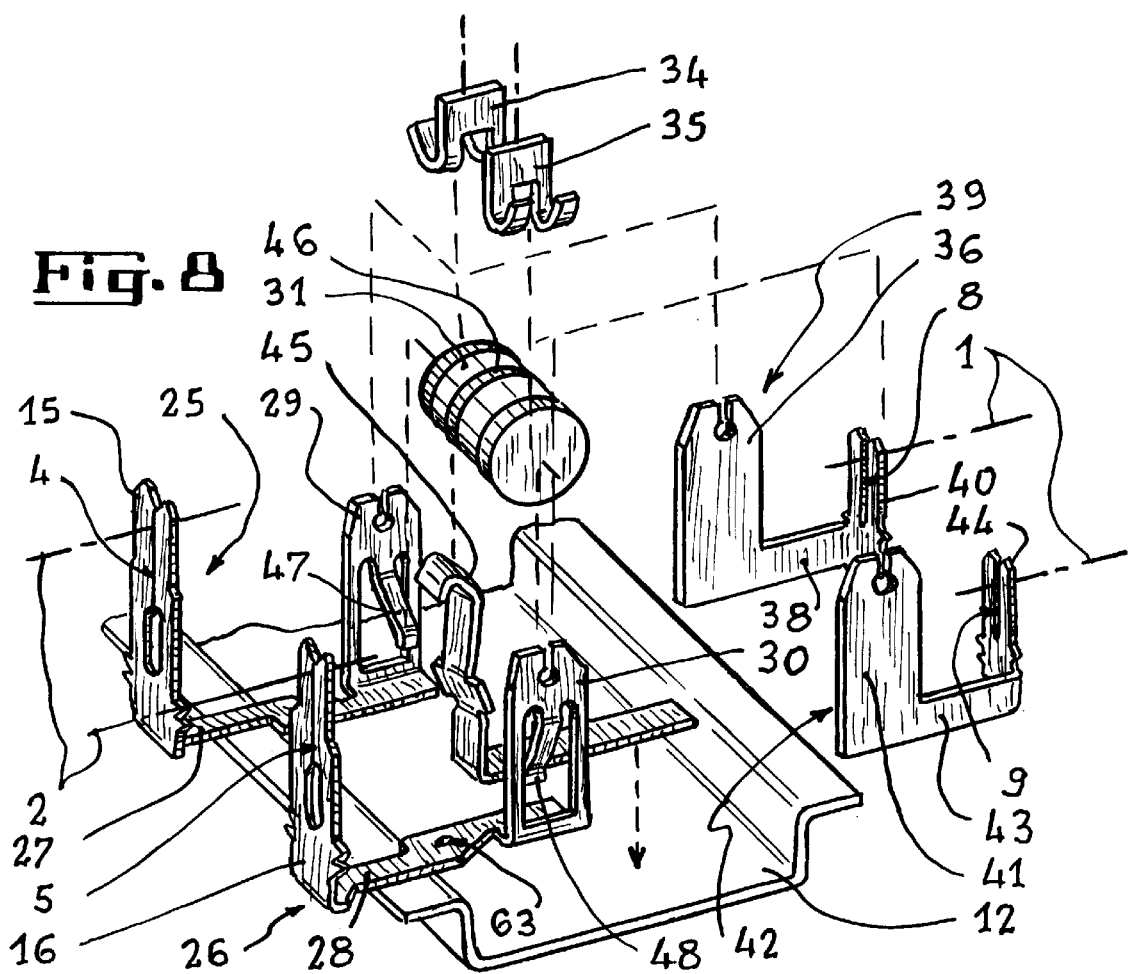
FIG. 8 is an exploded view of the assembly of connections included in this module, this view allowing its internal connections to be clearly understood.

The gel- or grease-injection circuits, both at the front (large wire side) and at the rear (small wire side) of the module are clearly visible in FIGS. 5, 6 and 7.

On the small wire 1 side, the circuit is very simple. It is composed, in the alignment and axis of each of the injection orifices 58, of a respective injection channel 59 for each of the blind orifices 53. Each of these two injection channels 59 is provided to be moulded in the body of the module. It is vertical in FIG. 5, and therefore perpendicular to the blind orifice 53 in the bottom of which it opens. These two orifices 53 are filled with the gel or grease without risk of forming air bubbles.

On the large wire 2 side, the two gel or grease injection circuits are a little more complex, as they ensure not only the injection, via respective channels 60 both parallel to the two vertical channels 59 mentioned above, of the gel or grease in the bottom of the two blind orifices 20 and 21, but also, by a respective by-pass channel, these two by-pass channels each presenting a horizontal branch 61 followed by a vertical branch 62, the injection of the gel or grease along and on each of the two large faces of each I.D.C. 15 and 16.

Each channel 60 is rectilinear, like its homologue 59, and is likewise moulded in the insulating body of the module. However, it traverses the horizontal branch 27 or 28 of the respective metal contact 25 or 26 associated therewith (FIG. 8), and, to that end, this horizontal metal branch 27 and 28 is pierced with a small orifice 63 for passage of the gel or grease.

The vertical channels 62 for conducting the gel or grease along the I.D.C.'s 15 and 16 are obtained by moulding of the receptacles 17 and 18, these latter consequently presenting swells 64 (FIG. 2).

Referring to FIGS. 5 and 7, it should be noted that the contacts 28 and 27 are well soaked by the sealing gel or grease, which is desired for a good protection of these contacts.

Nonetheless, it should be avoided that the gel or grease injected via the said orifice or orifices propagates towards the inside of the chamber 32. The latter must in fact remain free of gel or grease in order to be able, after its tight lid has been opened, to make the possibly repetitive tests with the aid of alligator clips or plugs as desired, without the latter being coated with such a gel or grease.

Now, as is clearly seen in FIG. 7, there must be provided, in the plastic insulating portion of the module, a relatively wide passage 120 for each advanced arm 47 for receiving a line electrode of the excess voltage protector 31.

In order to avoid the gel or grease propagating via this passage 120 in the chamber 32, the plastic body 119, 121 of the module is shaped at that spot so that, as shown, the angular flap 122 of the connecting branch 27 at that spot closes the bottom of this passage 120.

The module which has just been described presents the advantage not only of having relatively reduced manufacturing costs, but also of being able to be easily adapted, at little cost, to the particular desires of the clients.

In this respect, FIG. 9 shows how easy it is to transform this module so that it receives a plug-in module 66 for protection and cut-off which is for example identical to the module 22 of document U.S. Pat. No. 5,515,436 mentioned hereinbefore. To that end, it will suffice to modify the portion 6 of the module in order to adapt the chamber 32 for it to receive portion 210 according to this U.S. document.

Furthermore, this module may also be easily transformed for multiple assembly, in the factory, on a multi-pair cable, this type of assembly being called "block assembly". In this respect, FIG. 10 shows how this transformation and block assembly is effected on a multi-pair cable 67 (this operation being called "compounding of the cable" in the terms of the art).

To that end, the rear portion 7 of several modules according to FIG. 1 is eliminated and the modules are connected back to back in two's, as shown. It should be noted that the section of FIG. 10 is made along a broken line passing through the orifices 20 of one of the two modules back to back and through the axis of the screw 23 of the other module.

Consequently, in order to be able to receive the "small wires" contained in the multi-pair cable 67, the complex rear contacts 38, 42 (FIG. 8) of the two modules are closed, in accordance with FIG. 11 for example, to open downwardly, near the cable 67, as shown, which makes it possible to receive each strand 68 of the cable 67 in the corresponding I.D.C. 40.

In addition, the earth contact 45 presents the shape of a lyre as shown and terminates downwardly in the trough (or "pool") 69 for receiving the cable 67, via an I.D.C. 70.

A block 71 is constituted by a sufficient series of pairs of modules according to FIG. 10.

In the factory, an earth shunt (not shown) is plugged in all the earth I.D.C.'s 70, then is connected to the earth wire of the cable 67 in order then to allow the assembly to be earthed.

The inner part of the lower trough 69 is then filled with a coating resin after injection of the sealing gel or grease, and the block thus formed is then ready to receive all the large wires 2 outgoing towards the subscribers. In that case, the portions 3 of the modules may also be filled separately with gel or grease, and mounted on the receiving base before the coating operation.

It goes without saying that the invention is not limited to the embodiments which have just been described and many other easy adaptations of this module may in particular be envisaged.

For example, the excess voltage protector 31 might be received between the electrodes 36 and 41, and not between electrodes 29 and 30, after some obvious adaptations. In particular, the earth contact 45 would be reversed with respect to the one shown in FIG. 8.

This module might also simply be a cut-off module and not a cut-off and protection module, in which case it would not be adapted to receive an excess voltage protector.

The number of orifices for injecting the sealing gel or grease is not limited to four: it is quite possible for one, two, three or other number to exist.

What is claimed is:

1. A module for interconnecting two monopair lines, namely an incoming line and an outgoing line, the monopair lines having electric wires having an insulating sheathing with respective ends, the module comprising:

insulation-displacing contacts to connect the respective ends of the sheathed electric wires of each of the two pairs, the two sheathed electric wires of one of the two lines defining small wires and the two sheathed electric wires of the other line defining large wires, the small wires having conductive cores with diameters smaller than corresponding conducting cores of the large wires;

a line cut-off device incorporated in the module, wherein the line cut-off device is in the form of a test chamber having disposed therein an end of each of four test blades, each test blade coupled to a respective one of the insulation-displacing contacts, the test chamber being hermetically closed by a lid for line continuity or cut-off by interconnection of the test blades, wherein a first pair of the insulation-displacing contacts corresponds to the large wires and a second pair of the insulation-displacing contacts corresponds to the small wires, the first and second pairs of insulation-displacing contacts respectively positioned on opposite sides of the test chamber;

wherein the first and second pairs of insulation-displacing contacts are operatively associated with corresponding first and second devices for receiving and forced introduction of the two large wires and the two small wires, respectively, into respective insulation-displacing slots of the first and second pairs of insulation-displacing contacts, the first device being on the same side of the chamber as the first pair of insulation-displacing contacts and the second device being on the same side of the chamber as the second pair of insulation-displacing contacts; and wherein the first device comprises a screw for pushing the two large wires into the insulation-displacing slots of the first pair of insulation-displacing contacts.

2. The module of claim 1, wherein the second device for receiving and forced introduction of the small wires is a hand-actuated connection pusher.

3. The module of claim 1, wherein the module has tabs forming a slideway for fixation on a first rail, and at least one additional tab nearer one of said tabs than the other tab, so as to be able to alternatively mount this module on a second rail less wide than the first rail.

4. The module of claim 1 wherein the first device includes at least one end-of-stroke catch which not only ensures, by its clipping at the end of stroke, a solid positioning of the first device, but also, by the clacking sound made by such clipping, informs an assembler that the insulation-displacing connection is positively effected.

5. The module of claim 1 wherein the second device includes at least one end-of-stroke catch which not only ensures, by its clipping at the end of stroke, a solid positioning of the second device, but also, by the clacking sound made by such clipping, informs an assembler that the insulation-displacing connection is positively effected.

6. The module of claim 1, wherein the test chamber is arranged to receive, in a removable manner, an excess voltage protector.

7. The module of claim 6 further comprising insulating nippers wherein the excess voltage protector is retained in the insulating nippers, the insulating nippers comprising a gripping member which is flush with or projects beyond an opening of the test chamber when the excess voltage protector is positioned in the test chamber with the nippers, the nippers remaining in the test chamber with the excess voltage protector held by the nippers whereby the excess voltage protector can be extracted from the test chamber with the aid of the nippers.

8. The module of claim 1 wherein said lid includes a locking member which, when the first device is lifted by unscrewing the master actuation screw, the locking member renders the first device captive when the lid is closed.

9. The module of claim 8 wherein the locking member is constituted by at least one lateral catch.

10. The module of claim 1 further comprising at least one orifice for injection of a sealing gel or grease, the orifice being connected in the body of the module to at least one gel or grease injection channel, which at least terminate in the rear of two blind orifices for introduction of the two large wires and in the rear of two blind orifices for introduction of the two small wires, in order that these four blind orifices are filled with gel or grease via the rear of these blind orifices and not via their opening, which avoids the formation of air bubbles.

11. The module of claim 10, wherein, in order to avoid the gel or grease propagating, via one or more passages provided for the contacts located in the test chamber and bound, via a connection branch, each with a line connection insulation-displacing contact, the plastic body of the module is shaped at that spot or those spots for the angular flap of the connection branch at that spot to close the bottom of this passage and consequently oppose the passage of the gel or grease.

12. The module of claim 10 comprising a plurality of orifices for injection of gel or grease respectively towards said blind orifices, each orifice for injection of gel or grease coupled to a respective gel or grease injection circuit.

13. The module of claim 12, wherein, on the large wire side of the module, the gel or grease injection circuits ensure not only the injection of the gel or grease in the rear of the two blind orifices, but, via respective by-pass channels, the injection of the gel or grease along each insulation-displacing contact for receiving these large wires.

14. A module for interconnecting a first pair of insulated wires to a second pair of insulated wires, the module comprising:
a chamber including four terminals;
first and second pairs of insulation-displacing contacts, each insulation-displacing contact coupled to a corresponding one of the four terminals, the first pair of insulation-displacing contacts positioned on a first side of the chamber and the second pair of insulation-displacing contacts positioned on a second side of the chamber substantially opposite the first side;
first and second devices each having at least one opening for receiving the first and second pairs of insulated wires, respectively, wherein the first and second devices insert the first and second pairs of insulated wires into the first and second pairs of insulation-displacing contacts, respectively; and
a chamber lid having contacts for interconnecting the four terminals.

15. The module according to claim 14 further comprising:
an insulating nipper having a gripping member positioned toward an opening of the chamber; and
an excess voltage protector retained in the insulating nipper and positioned in the chamber, whereby the excess voltage protector may be removed from the chamber by pulling the gripping member.

16. The module according to claim 14 wherein the chamber lid includes a locking member which prevents removal of the first device when the chamber lid is closed.

17. The module according to claim 14 further comprising:
at least one injection orifice in the first side of the module coupled to respective rear openings of the pair of orifices for receiving the first pair of insulated wires; and
at least one injection orifice in the second side of the module coupled to respective rear openings of the pair of orifices for receiving the second pair of insulated wires.

18. The module according to claim 17 further comprising at least one by-pass channel coupling the at least one injection orifice in the first side of the module to the first pair of insulation-displacing contacts for injecting gel or grease along the first pair of insulation-displacing contacts.

19. A module for interconnecting two monopair lines, namely an incoming line and an outgoing line, the monopair lines having electric wires having an insulating sheathing with respective ends, the module comprising:
insulation-displacing contacts to connect the respective ends of the sheathed electric wires of each of the two pairs, the two sheathed electric wires of one of the two lines defining small wires and the two sheathed electric wires of the other line defining large wires, the small wires having conductive cores with diameters smaller than corresponding conducting cores of the large wires;
a line cut-off device incorporated in the module,
wherein the line cut-off device is in the form of a test chamber having disposed therein an end of each of four test blades, each test blade coupled to a respective one of the insulation-displacing contacts, the test chamber being hermetically closed by a lid for line continuity or cut-off by interconnection of the test blades,
wherein a first pair of the insulation-displacing contacts corresponds to the large wires and a second pair of the insulation-displacing contacts corresponds to the small wires, the first pair of insulation-displacing contacts positioned on a first side of the test chamber and the second pair of insulation-displacing contacts positioned on a second side of the test chamber opposite the first side;
wherein the first and second pairs of insulation-displacing contacts are operatively associated with corresponding first and second devices for receiving and forced introduction of the two large wires and the two small wires, respectively, into respective insulation-displacing slots of the first and second pairs of insulation-displacing contacts, the first device located on the same side of the chamber as the first pair of insulation-displacing contacts and receiving the two large wires in a first direction, the second device located on the same side of the chamber as the second pair of insulation-displacing contacts and receiving the small wires in a second direction substantially opposite the first direction.

20. A module according to claim 19 further comprising a screw for pushing the large wires into the insulation-displacing slots of the first pair of insulation-displacing contacts.

21. A module for interconnecting two monopair lines, namely an incoming line and an outgoing line, the monopair lines having electric wires having an insulating sheathing with respective ends, the module comprising:

insulation-displacing contacts to connect the respective ends of the sheathed electric wires of each of the two pairs, the two sheathed electric wires of one of the two lines defining small wires and the two sheathed electric wires of the other line defining large wires, the small wires having conductive cores with diameters smaller than corresponding conducting cores of the large wires;

a line cut-off device incorporated in the module, wherein the line cut-off device is in the form of a test chamber having disposed therein an end of each of four test blades, each test blade coupled to a respective one of the insulation-displacing contacts, the test chamber being hermetically closed by a chamber lid having contacts for interconnecting the test blades when the chamber lid is in a closed position, wherein a first pair of the insulation-displacing contacts corresponds to the large wires and a second pair of the insulation-displacing contacts corresponds to the small wires, the first and second pairs of insulation-displacing contacts respectively positioned on opposite sides of the test chamber;

wherein the first and second pairs of insulation-displacing contacts are operatively associated with corresponding first and second devices for receiving and forced introduction of the two large wires and the two small wires, respectively, into respective insulation-displacing slots of the first and second pairs of insulation-displacing contacts, the first device located on the same side of the chamber as the first pair of insulation-displacing contacts and the second device located on the same side of the chamber as the second pair of insulation-displacing contacts.

22. A module according to claim 21 further comprising a screw for pushing the large wires into the insulation-displacing slots of the first pair of insulation-displacing contacts.

* * * * *